United States Patent [19]

El-Ghatta et al.

[11] 3,966,635

[45] June 29, 1976

[54] PROCESS FOR REACTIVATING PLATINUM CATALYSTS USED IN PRODUCTION OF HYDROXYLAMMONIUM SALTS

[75] Inventors: Hussain El-Ghatta, Chur, Grisson; Johann Karl Forrer, Domat-Ems, Grisson, both of Switzerland

[73] Assignee: Inventa AG fur Forschung und Patentverwertung, Zurich, Switzerland

[22] Filed: Mar. 17, 1975

[21] Appl. No.: 558,703

[30] Foreign Application Priority Data
Mar. 21, 1974 Switzerland.......................... 3906/74

[52] U.S. Cl.............................. 252/413; 252/439; 252/447; 423/387
[51] Int. Cl.².................. B01J 23/42; C01B 21/20
[58] Field of Search ............ 252/413, 447; 423/387, 423/388

[56] References Cited
UNITED STATES PATENTS

| | | |
|---|---|---|
| 2,823,101 | 2/1958 | Jockers et al....................... 423/387 |
| 3,060,133 | 10/1962 | Jockers et al....................... 423/387 |
| 3,295,925 | 1/1967 | Fueg et al........................... 423/388 |
| 3,416,886 | 12/1968 | Capaul et al....................... 423/388 |
| 3,663,166 | 5/1971 | Weise et al......................... 252/447 |
| 3,803,054 | 4/1974 | Habig et al......................... 252/439 |

Primary Examiner—Winston A. Douglas
Assistant Examiner—P. E. Konopka
Attorney, Agent, or Firm—Bierman & Bierman

[57] ABSTRACT

A process for reactivating platinum catalysts is disclosed. It comprises treating a platinum catalyst having reduced activity and selectivity a. in a first stage with an acid solution of a sulfur compound which liberates sulfurous acid in acid medium, and a hydroxylammonium salt, said treatment being conducted in the absence of oxidizing agents capable of oxidizing sulfurous acid to sulfate, and b. in a second stage with an acid solution of platinum (II) or platinum (IV) compounds in the presence of hydrogen.

18 Claims, No Drawings

PROCESS FOR REACTIVATING PLATINUM CATALYSTS USED IN PRODUCTION OF HYDROXYLAMMONIUM SALTS

The present invention relates to a process for increasing the activity and selectivity of catalysts containing platinum metal and to the use of these catalysts for the catalytic hydrogenation of nitric oxide in acid medium to give hydroxylammonium salts.

It is known that the activity and selectivity of platinum metal catalysts used for hydrogenation of nitric oxide in acid medium to hydroxylammonium salts decrease during the operation of the process, an occurrence which is referred to as "catalyst aging". It is therefore desirable to increase the activity and selectivity of these catalysts and consequently extend catalyst life.

A process has now been found which permits the activity and, surprisingly, also the selectivity of aged catalysts to be increased, so that these catalysts can continue to be used without disturbance in the preparation of hydroxylammonium salts.

The process according to the present invention is characterized in that the "aged" catalyst, i.e. the catalyst of reduced activity and selectivity, is treated (a) in a first stage, in an acid medium, with a sulfur compound which liberates sulfurous acid under acid conditions and in the presence of hydroxylammonium salts, the treatment being conducted in the absence of oxidizing agents which are capable of oxidizing the sulfurous acid to form sulfate, and (b) in a subsequent second stage with an aqueous solution of $Pt^{+4}$ or $Pt^{+2}$ compounds (preferably $Pt^{+4}$ compounds) in an acid medium and in the presence of hydrogen and if necessary also of nitric oxide.

As catalysts containing platinum metal which are treated in accordance with the invention there may be employed in particular the preparations conventionally used for the catalytic hydrogenation of nitric oxide, for example 0.5 – 5% Pt on activated carbon or graphite.

As stated above, this process must be performed in the absence of oxidizing agents capable of producing sulfate from sulfite ion. Hence, atmospheric oxygen must be removed. Preferably this is accomplished by purging the aqueous catalyst suspension with an inert gas such as argon or nitrogen. Hydrogen can also be used for this purpose. At least the gas must be supplied at a rate of 2.5 liters per liter of catalyst suspension per hour.

Examples of sulfur compounds which liberate sulfurous acid in an acid medium are salts of sulfurous acid, dithionous acid and thiosulfuric acid. The alkali salts, especially sodium salts, are preferably used here throughout. The sulfur compounds are added in an amount of 1–150 atom %, preferably 10–60 atom %, of sulfur, based on the amount of platinum metal contained in the untreated catalyst. Alkali sulfites, particularly sodium sulfite, are preferred. These sulfur compounds are advantageously employed in the form of a 0.01–1.0% aqueous solution.

The treatment of the catalysts is suitably effected in a solution having a concentration of 1 – 5N, preferably 2 – 4N, of hydroxylammonium salts and 0 – 5N, in particular 0.5 – 2N, of sulfuric acid. The preferred hydroxylammonium salt is hydroxylammonium sulfate.

To achieve the desired effect, it is advisable to carry out the treatment over a period of 0.1 – 15 hours (0.5 – 5 hours is the preferred time) before the catalyst is subjected to the second stage of treatment.

The treatment of the catalyst with the sulfur compounds as defined is preferably carried out under a protective gas, for example nitrogen and without or with very low gas throughput (1 liter of nitrogen per liter of catalyst per hour at the most).

$PtCl_4$ or $PtCl_2$, and/or $H_2PtCl_4$ or $H_2PtCl_6$, are preferably employed as platinum compounds, the tetravalent Pt-compounds being preferred. These compounds are used, preferably, as 0.01 – 1.0% aqueous solutions.

The amount of Pt added is 1 – 30% (by weight), preferably 5 – 20% (by weight), referred to the amount of Pt which the catalyst has contained when used for the first time, that is, before treatment for the first time in accordance with the present invention.

The treatment temperature is advantageously between 15° and 100°C.

The catalyst treated in accordance with the invention is employed primarily for the catalytic hydrogenation of nitric oxide (NO) in acid solution to give hydroxylammonium salts. Hence, the second stage of catalyst treatment, the platinization of the aged catalyst in the presence of hydrogen, may be coupled with the catalytic hydrogenation of NO. The NO present at this time does not disturb the reaction.

One commercial advantage of the present process resides in that the catalyst no longer has to be isolated and exchanged after aging; it can be treated in the hydrogenation solution in which it happens to be. Therefore, no interruptions of operation or only very brief interruptions become necessary, with saving of expenditure of time and work and of the cost of catalyst.

The following Examples illustrate the invention.

EXAMPLE 1

2 liters of an aqueous solution of the following composition are placed in a 2-liter stirring reaction vessel:
3.1N hydroxylammonium sulfate
0.4N ammonium sulfate
1.0N sulfuric acid
7.0 g of 1.0% platinum on activated carbon as support per liter of reaction vessel solution are then added as aged catalyst. 40 liters of nitrogen gas are passed into the stirred suspension during a period of 1 hour.

After this supply of gas, 100 ml of aqueous $Na_2SO_3$ solution (0.0546 g $Na_2SO_3$ to 100 ml $H_2O$), corresponding to 60 atom % of sulfur, referred to platinum, are added and the suspension is stirred for 1 hour at 25°– 30°C under $N_2$ atmosphere. Thereafter, 75 standard liters of $H_2$ per hour are passed in at 40°C.

Following this, 20 ml of a solution of 2.422 g of $PtCl_4$ in 1 liter of 1N sulfuric acid are passed dropwise into the reaction vessel.

After ½ hour, 25 standard liters of nitric oxide per hour are passed into this suspension, while the introduction of hydrogen continues. The duration of reduction of nitric oxide with hydrogen is 8 hours. The concentration of acid is kept constant by hourly removal of product and appropriate addition of sulfuric acid (about 4.8N).

The activity, selectivity and yields for the catalyst treated by the discovered process are as follows:

|  | Conversion of NO (%) | Selectivity Val $(NH_3OH)_2SO_4$ / Val $(NH_4)_2SO_4$ | Yield % $(NH_3OH)_2SO_4$ | $(NH_4)_2SO_4$ | $N_2O$ | Volume-time yield g $(NH_3OH)_2SO_4$ / l · h |
|---|---|---|---|---|---|---|
| Treated catalyst | 70 | 11.1 | 83 | 7.5 | 9.5 | 26.6 |
| Catalyst used* | 32 | 0 | 0 | 0 | 100 | 0 |

*(without treatment)

EXAMPLE 2

2 liters of an aqueous solution of the following composition are placed in a 2-liter stirring reaction vessel:
3.1N hydroxylammonium sulfate
0.4N ammonium sulfate
1.0N sulfuric acid
7.0 g of 1.0% platinum on activated carbon per liter of reaction vessel solution are added as aged catalyst. 40 liters of nitrogen gas are passed into the stirred suspension during a period of 1 hour. After this supply of gas, 100 ml of aqueous $Na_2SO_3$ solution (0.0546 g $Na_2SO_3$ in 100 ml $H_2O$), corresponding to 60 atom % of sulfur, referred to platinum, are added and the suspension is stirred for 1 hour at 25°– 30°C under $N_2$ atmosphere.

Thereafter, a mixture of 75 standard liters of hydrogen per hour and 25 standard liters of nitric oxide per hour is passed in at 40°C and 20 ml of a solution of 2.422 g of $PtCl_4$ in 1 liter of 1N sulfuric acid are passed dropwise into the reaction vessel. The duration of the reaction is 8 hours. The acid concentration is kept constant by hourly removal of product and addition of sulfuric acid (about 4.8N).

The activity, selectivity and yields for the catalyst treated in this ways are as follows:

|  | Conversion of NO (%) | Selectivity Val $(NH_3OH)_2SO_4$ / Val $(NH_4)_2SO_4$ | Yield % $(NH_3OH)_2SO_4$ | $(NH_4)_2SO_4$ | $N_2O$ | Volume-time yield g $(NH_3OH)_2SO_4$ / l · h |
|---|---|---|---|---|---|---|
| Treated catalyst | 72 | 19 | 80.5 | 4.25 | 15.25 | 26.6 |
| Catalyst used (without treatment) | 32 | 0 | 0 | 0 | 100 | 0 |

EXAMPLE 3

1 liter of an aqueous solution of the following composition is placed in a 2-liter stirring reaction vessel:
3.1N hydroxylammonium sulfate
0.4N ammonium sulfate
1.0N sulfuric acid
100 g of 1.0% platinum on activated carbon as support are added as aged catalyst. While stirring, about 200 liters of nitrogen gas are passed into the catalyst suspension during a period of 2 hours. Thereafter, the amount of $N_2$ is reduced to 5 liters/h and the stream of gas is no longer passed through the suspension, but over the surface of the liquid. 100 ml of aqueous $Na_2SO_3$ solution (0.065 g $Na_2SO_3$ in 100 ml $H_2O$), corresponding to 10 atom % of sulfur, based on platinum, are passed into the reaction vessel dropwise in ½ hour.

The suspension is then stirred for 1 hour at 30°C under nitrogen. The catalyst is then filtered off and washed until the wash water is free from sulfate anions.

A suspension of 14 g of the treated catalyst and 2 liters of 4.5N $H_2SO_4$ is placed in a 2-liter stirring reaction vessel.

75 standard liters of hydrogen per hour are passed in at 40°C. 10 ml of a solution of 2.422 g of $PtCl_4$ in 1 liter of 1N sulfuric acid are passed dropwise into the reaction vessel. For nitric oxide hydrogenation, 25 standard liters of nitric oxide per hour are passed in after 2 hours.

The activity, selectivity and yields for the treated catalyst are as follows:

|  | Conversion of NO (%) | Selectivity Val $(NH_3OH)_2SO_4$ / Val $(NH_4)_2SO_4$ | Yield % $(NH_3OH)_2SO_4$ | $(NH_4)_2SO_4$ | $N_2O$ | Volume-time yield g $(NH_3OH)_2SO_4$ / l · h |
|---|---|---|---|---|---|---|
| Treated catalyst | 56 | 4 | 72 | 18.0 | 9.0 | 18.5 |
| Catalyst used (without treatment) | 32.0 | 0 | 0 | 0 | 100 | 0 |

EXAMPLE 4

2 liters of an aqueous solution of the following composition are placed in a 2-liter stirring reaction vessel:
3.1N hydroxylammonium sulfate
0.4N ammonium sulfate
1.0N sulfuric acid
14.0 g of a Pt catalyst (1% Pt/activated carbon), the activity and selectivity of which have been reduced after a 3-month period of use, are added to this mixture. 40 liters of nitrogen gas are passed into the suspension obtained during a period of 1 hour. After this supply of gas, 100 ml of aqueous $Na_2S_2O_4 \cdot H_2O$ (10.3 mg of $Na_2S_2O_4 \cdot H_2O$ in 100 ml $H_2O$), corresponding to 15 atom % of sulfur, based on the platinum, are added and the suspension is stirred for 1 hour at 25°–30°C under $N_2$ atmosphere. Thereafter, a mixture of 75 standard liters/h of $H_2$ and 25 standard liters/h of NO are introduced at 40°C. 10 ml of a solution of 2.422 g of $PtCl_4$ in 1 liter of 1N sulfuric acid are introduced dropwise into the reaction vessel. The duration of the reaction is 8 hours. The concentration of acid is kept constant by hourly removal of product and addition of sulfuric acid (about 4.8N).

The activity, selectivity and yields for the catalyst treated in this way are as follows:

|  | Conversion of NO (%) | Selectivity $\frac{Val(NH_3OH)_2SO_4}{Val\ (NH_4)_2SO_4}$ | Yield % $(NH_3OH)_2SO_4$ | $(NH_4)_2SO_4$ | $N_2O$ | Volume-time yield $\frac{g\ (NH_3OH)_2SO_4}{l\cdot h}$ |
|---|---|---|---|---|---|---|
| treated catalyst | 64 | 6.3 | 78.5 | 12.5 | 9.0 | 23.0 |
| Catalyst used (without treatment) | 52.5 | 0.74 | 31.8 | 43.1 | 25.1 | 7.65 |

What is claimed is:

1. A process for rejuvenating an aged platinum catalyst which has been used for hydrogenation of nitric oxide to hydroxylammonium salts in an acid medium, which process comprises
   a. treating the catalyst in the presence of a hydroxylammonium salt in a first stage with a sulfur compound in an aqueous acid medium, wherein said sulfur compound liberates sulfurous acid when subjected to said acid medium, said sulfurous acid being present in an amount of 1 to 150 atom % of sulfur based on the amount of platinum metal in said aged catalyst, said treatment being conducted substantially in the absence of oxidizing agents capable of oxidizing sulfurous acid to sulfate and for from 0.1 to 15 hours, thus obtaining a first-treated catalyst, and
   b. treating the first-treated catalyst in a second stage with di- or tetravalent platinum compound in acid medium in the presence of hydrogen, said platinum compound being present in a platinum amount of 1 to 30% by weight based on the amount of platinum which the catalyst contained when used for the first time.

2. The process of claim 1 in which the sulfur compound is an alkali metal sulfite.

3. The process of claim 1 in which the sulfur compound is sodium sulfite.

4. The process of claim 1 in which the acid medium is sulfuric acid.

5. The process of claim 1 in which the hydroxylammonium salt is hydroxylammonium sulfate.

6. The process of claim 1 in which the platinum compound is platinum tetrachloride or chloroplatinic acid.

7. The process of claim 1 in which the second stage treatment is further conducted in the presence of nitric oxide.

8. The process of claim 1 in which the acid medium is sulfuric acid, the sulfur compound is an alkali metal sulfite, the hydroxylammonium salt is hydroxylammonium sulfate and the platinum compound is platinum tetrachloride or chloroplatinic acid.

9. The process of claim 1 wherein said percent of sulfur is 10 to 60 atom percent.

10. The process of claim 1 wherein said treatment is carried out for from 0.5 to 5 hours.

11. The process of claim 1 wherein said platinum amount is 5 to 50 percent by weight.

12. The process of claim 1 wherein said salt is present in 1N to 5N solution.

13. The process of claim 12 wherein said salt is present in 2N to 4N solution.

14. The process according to claim 1 wherein said aqueous acid medium is 0.5N to 2N sulfuric acid.

15. The process of claim 1 wherein said platinum compounds are present as 0.01 to 1.0 percent solutions.

16. The process of claim 1 wherein said process is carried out between 15° and 100°C.

17. The process of claim 1 wherein said aged catalyst comprises 0.5 to 5 percent platinum on activated carbon or graphite.

18. The process of claim 1 wherein said sulfur compound is in 0.01 to 1.0 percent aqueous solution.

* * * * *